Feb. 11, 1947.  A. A. HOLFELDER  2,415,690
METHOD OF AND MEANS FOR REMOVING EMBEDDED MATERIAL
Filed May 1, 1943
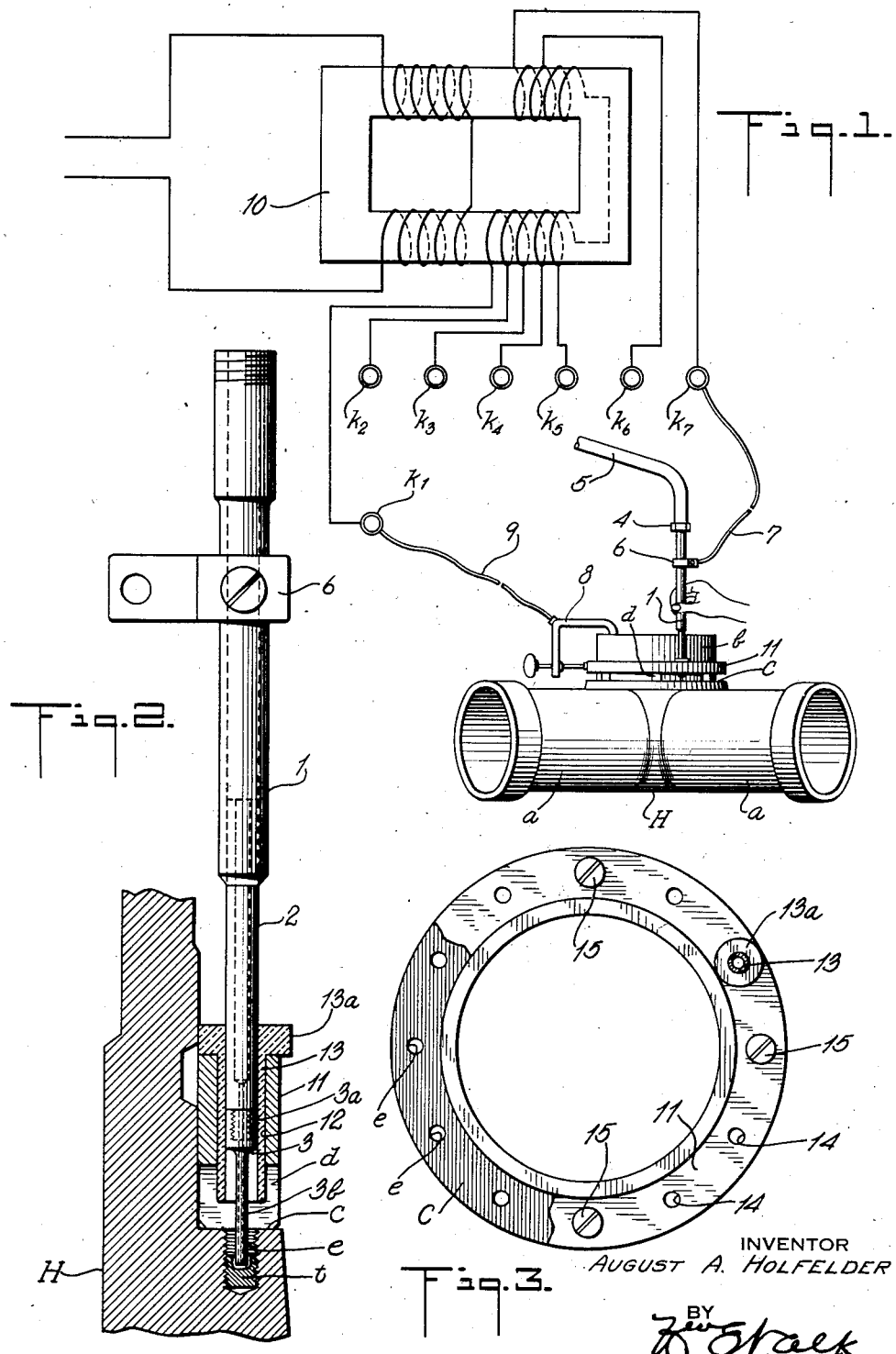
INVENTOR
AUGUST A. HOLFELDER
BY
ATTORNEY Patented Feb. 11, 1947

2,415,690

UNITED STATES PATENT OFFICE 2,415,690

METHOD OF AND MEANS FOR REMOVING EMBEDDED MATERIAL

August A. Holfelder, Essex, N. J., assignor to Curtiss-Wright Corporation, a corporation of Delaware Application May 1, 1943, Serial No. 485,564

10 Claims. (Cl. 219—15)

My invention relates to a method of and means for removing solid or other material from a structure in which it is embedded.

In accordance with the invention, the tip of an electrode is intermittently moved into and out of engagement with the embedded material, a suitable arrangement being provided for passing electrical current through said material while the electrode tip is in engagement therewith.

My invention relates particularly to an electrode comprising a heat-resistant nozzle or tip, the electrode comprising an internal passage through which air under pressure is directed to the end of said nozzle or tip.

Various other objects, advantages and features of my invention will become apparent from the following detailed description.

My invention resides in the method of and means for removing embedded solid material, combinations and arrangements of the character hereinafter described and claimed.

For an understanding of my invention and for an illustration of one of the forms thereof, reference is to be had to the accompanying drawing, in which:

Figure 1 is an elevational view, partly schematic, illustrating the method and means of my invention;

Fig. 2 is a vertical sectional view, partly in elevation, showing my novel electrode in operative position with respect to a piece of embedded solid material; and Fig. 3 is a plan view, partly broken away, showing a detailed feature of the invention.

Referring to Fig. 1, I have shown a hub H which comprises a plurality of angularly related tubular members $a$ utilizable individually for supporing a propeller blade, not shown. As illustrated, the hub H comprises a tubular section $b$ which rises from a circular flanged surface $c$ formed on said hub H, the flanged surface $c$ having a plurality of lugs or abutments $d$ rising therefrom, all of these abutments $d$ having the same height.

As well understood in the art, propeller hubs H of the character referred to have a plurality of symmetrically arranged passages $e$ drilled into the flanged surface $c$ thereof, each passage $e$ being threaded in the customary manner by a tap $t$ and these, especially those of small diameter, are easily broken. Prior to my invention, it has been extremely difficult or impossible to remove any broken taps from the hub H without damaging the same to such extent that it becomes scrap.

In accordance with the invention, I provide a novel electrode which, in the manner hereinafter described, is used for removing a broken tap $t$ from the passage $e$ in which it is embedded. As shown particularly in Fig. 2, the electrode of the invention comprises a tube $1$ to one end of which, in suitable manner, is secured one end of a rod $2$ which, at its other end, has one end of the electrode tip or nozzle $3$ threaded or secured thereto in any other suitable manner. Preferably and as illustrated, the nozzle $3$ comprises a large section $3a$ and a reduced section $3b$, the section $3a$ having the same exterior configuration as the rod $2$. As shown, the tube $1$, the rod $2$ and the nozzle $3$ are provided, respectively, with longitudinal passages which form a continuous passage extending entirely through the electrode. Secured in suitable manner, to the upper end of the tube $1$, is a coupling $4$ for an air hose $5$ which delivers air under suitable pressure to the tube $1$, such air, as hereinafter described, passing through the aforesaid continuous passage and being ejected from the end of the nozzle $3$.

Secured to the tube $1$ is a suitable clamp $6$ which has one end of an electrical conductor $7$ secured thereto. Associated in suitable manner and in electricity-conducting relation with the hub H is a clamp $8$ having one end of another electrical conductor $9$ connected thereto.

In Fig. 1, I have shown a suitable electrical transformer $10$ which comprises a primary winding having an input circuit connected to a source of electrical current. The secondary winding of the transformer $10$ has associated therewith a plurality of branching conductors which terminate in the respective contact members $k1$, $k2$, $k3$, $k4$, $k5$, $k6$ and $k7$. As shown, the aforesaid conductor $7$ is connected to the contact member $k7$ and the aforesaid conductor $9$ is connected to the contact member $k1$. Preferably, although not necessarily, the transformer arrangement described above is a "Martindale Etchograph," model A, 110 volt, 60 cycles, A. C. Across the contact members $k1$ and $k7$, a maximum output voltage of 4.5 volts is obtained, the output voltages across the contact members $k1$ and $k6$, $k1$ and $k5$, etc., decreasing in a progressive manner.

In accordance with the invention, the hub section $b$ has associated therewith a snugly fitting ring $11$ which rests upon the above described lugs $d$. As shown in Fig. 2, the ring $11$ has extending therethrough a passage $12$ which receives a tubular member $13$ having a flanged section $13a$ adapted to rest on the upper surface of the ring $11$, the tubular member $13$ and its flanged section 13a being formed from hard rubber or other suitable electricity-insulating material. The internal diameter of the tubular member 13 is only slightly larger than the external diameter of the rod 2 and the enlarged nozzle section 3a. With an arrangement of this character, the tubular member 13 serves as a guide readily permitting movement of the electrode upwardly and downwardly in a vertical direction while preventing tilting movement thereof.

The ring 11 comprises passages 14 which extend vertically therethrough when the parts are disposed as shown on the drawing. The passages 14 are symmetrically arranged with respect to each other and with respect to the aforesaid passage 12 in correspondence with the symmetrical arrangement of the passages e which were described above as drilled into the flanged surface c of the hub H. Accordingly, with a broken tap t in one of the passages e, the ring 11 may be so positioned that the longitudinal axis of the tubular member 13 substantially coincides with the longitudinal axis of said last named passage e. When the ring 11 is thus positioned, the passages 14 thereof are in vertical alinement with the hub passages e and, accordingly, at least two screws 15, Fig. 3, may be associated with the respective sets of the passages 14, e to thereby positively secure the ring 11 to the hub H in the desired position.

After the ring 11 has been positioned and secured as described above, the operator secures the ground clamp 8 in the position shown in Fig. 1 or otherwise as may be desirable whereupon, after the conductors 7 and 9 have been connected to the respective contact members k1 and k1, the operator by suitable adjustment of the air supply, regulates the intensity of the air blast emerging from the nozzle 3. Thereupon, the lower end of the electrode is passed downwardly through the tubular member 13 as indicated generally in Fig. 2 and, while the electrode is manually held as indicated in Fig. 1, it is moved downwardly until the lower end of the nozzle 3 comes into contact with the broken tap t. When this happens, the electrical circuit is completed and an arc is produced to thereby burn away some of the material forming said tap t. Immediately after engagement is thus effected between the nozzle 3 and the tap t, the electrode is manually elevated a short distance and then returned to the arcing position first described. In this manner, as the electrode is intermittently moved into and out of engagement with the tap t, the material forming the same is consumed by the described arcing action.

The described air blast is important in connection with the invention. This air blast is directed by the nozzle 3 directly on that area of the broken tap t which is subjected to the arcing action with resultant desired dissipation of the heat which is generated by such arcing action. In addition, the air blast has the desirable function of forcibly expelling particles of burnt tap material from the cavity.

It will be observed that the diameter of the nozzle section 3b is somewhat smaller than the diameter of the passage e. The tubular member 13 guides the electrode for movement upwardly and downwardly, under the described operator control, substantially in a vertical direction and, hence, the lower end of the nozzle section 3b intermittently engages the broken tap t and does not inadvertently engage the threads formed on the interior surface of said passage e. Due to this positive control on the movement of the electrode, the aforesaid threads are free from the arcing effect which is localized in the desired area, namely, that of the solid material forming the broken tap t.

The above described tube 1, rod 2 and nozzle 3 may be formed from such material as is suitable or desirable. In actual practice, although not necessarily, the tube 1 has been formed from hard drawn brass while the rod 2 has been formed from hard drawn copper. The nozzle 3 should be formed from suitable heat-resistant metal such, for example, as a molybdenum compound known in the art as "100 M. Elkonite."

As indicated in Fig. 2, reciprocation of the electrode as described may cause the formation of an internal passage in the broken tap t. Ordinarily, the surrounding tap material collapses into this passage and is either burned away or expelled by action of the air blast. However, under some circumstances, it may be necessary to remove the electrode and use a suitable tool to disintegrate the material surrounding the passage which is thus burned into the broken tap.

As stated above, the arrangement is such that the desired reciprocatory movement is imparted to the electrode nozzle while preventing the same from touching the threads in the passage e with the result that these threads are not affected by the arcing action. Should small particles of material remain in the threads after completion of the arcing action, the passage e may be retapped to thereby clean and renew the threads.

It will be understood that the invention is not to be limited to the particular transformer arrangement hereinbefore described in some detail. In the disclosed form of the invention, the voltage which produces the arcing effect is 4.5 volts and, obviously, the invention is not to be limited in this respect.

As hereinbefore described, the electrode is manually held and reciprocated, i. e., moved into and from engagement with the broken tap t. If desired, a suitable mechanical arrangement may be provided for obtaining and reciprocating the electrode for the purpose described.

Although the invention has been described with respect to the removal of broken taps, it will be understood that the same is readily applicable to the removal of broken drills or other embedded materials or objects. Further, it will be understood that the invention is not to be limited to the removal of embedded objects from a propeller hub since the latter has been illustrated and described merely for purposes of explanation of the invention. Embedded objects such as broken drills or taps may, by the invention, be readily removed from metallic structures differing widely from and utilizable for widely different purposes than the hub H herein disclosed. It shall also be understood that the invention is not to be limited to the utilization of a fixture such as the ring 11. With a hub H of the character herein described, a fixture ring of this character serves advantageously. However, for other classes of work, it will be understood that the fixture for guiding the electrode in a reciprocatory manner as described will necessarily be suited to the particular configuration of the structure in which is embedded the material to be removed.

The arcing method and apparatus herein described is far superior to the expedients of prior practice. The arcing operation may readily be completed in a minimum of time and the resultant salvage of expensive machine parts is highly important.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a method of removing portions of electrically conductive material, the steps of alternately making and breaking an electrical arc between an electrode and said material, and while said arc is out directing a cooling stream of fluid upon said material at the seat of said arc.

2. In apparatus for burning out portions of metal, an elongated electrode, means for forming an intermittent arc between said electrode and said metal including means for vibrating said electrode along its length, and means for directing a fluid stream upon said arc at its seat on said metal.

3. A method of cutting metal which consists in, establishing an electric arc between an electrode and the metal body to be cut, repeatedly interrupting the arc by relative movement between the electrode and metal body in a direction to attenuate the arc, and directing a pressure stream of cooling fluid against the arc seat on the metal body to cool the metal in the vicinity of the arc and vacate the metal liberated by the arc.

4. In the art of removing material from a structure, the steps which consists in intermittently moving the tip of an electrode into and out of engagement with such material, passing electrical current through the electrode, through the material and through said structure each time that the electrode tip engages said material, and passing a cooling medium through the electrode and into contact with the material while the operation proceeds.

5. In the art of removing material from a structure, the steps which consist in guiding an electrode for to-and-fro movement substantially in one direction whereby the electrode tip is moved into and out of engagement with such material, passing electrical current through the electrode, through the material and through said structure each time that the electrode tip engages said material, and passing a cooling medium through the electrode and into contact with the material while the operation proceeds.

6. In the art of removing material from a structure, the steps which consist in imparting to-and-fro movement to an electrode guided in a passage formed in a stationary fixture whereby the electrode tip is moved into and out of engagement with such material, passing electrical current through the electrode, through the material and through said structure each time that the electrode tip engages said material, and directing a blast of air through the electrode and into engagement with the material while the operation proceeds.

7. In apparatus for burning out portions of metal, an elongated electrode composed of a tubular conducting shank and a heat resistant conducting tip, means for forming an intermittent arc between said electrode and said metal including means for vibrating said electrode along its length, and means for directing a fluid stream upon said arc at its seat on said metal.

8. In apparatus for burning out portions of metal, an elongated electrode composed of a tubular conducting shank and a heat resistant molybdenum conducting tip, means for forming an intermittent arc between said electrode and said metal including means for vibrating said electrode along its length, and means for directing a fluid stream upon said arc at its seat on said metal.

9. In apparatus for burning out portions of metal, an elongated electrode composed of a tubular conducting shank and a heat resistant conducting tip, guide means for slidably receiving said electrode, means for forming an intermittent arc between said electrode and said metal including means for vibrating said electrode along its length, and means for directing a fluid stream upon said arc at its seat on said metal.

10. In apparatus for burning out portions of metal, an elongated electrode composed of a tubular conducting shank and a heat resistant molybdenum conducting tip, guide means for slidably receiving said electrode, means for forming an intermittent arc between said electrode and said metal including means for vibrating said electrode along its length, and means for directing a fluid stream upon said arc at its seat on said metal.

AUGUST A. HOLFELDER.

REFERENCES CITED

The following references are of record in the file of this patent:

UNITED STATES PATENTS

| Number | Name | Date |
|---|---|---|
| 650,124 | Coleman | May 22, 1900 |
| 866,498 | Menne | Sept. 17, 1907 |
| 1,318,147 | Herick | Oct. 7, 1919 |
| 1,324,337 | Chapman et al. | Dec. 9, 1919 |
| 2,066,588 | Taylor | Jan. 5, 1937 |
| 2,079,310 | Bennett | May 4, 1937 |
| 2,273,819 | Cooke et al. | Feb. 24, 1942 |
| 1,281,454 | White | Oct. 15, 1918 |
| 1,609,859 | Bond | Dec. 7, 1926 |
| 1,804,059 | Miller | May 5, 1931 |